United States Patent
Beauford

(10) Patent No.: US 7,894,454 B2
(45) Date of Patent: Feb. 22, 2011

(54) SPECIAL TERMINATION MOBILE ANNOUNCEMENT, FOR WIRELESS VOIP CUSTOMIZED RING BACK TONE SERVICE

(75) Inventor: Kevin D. Beauford, Chicago, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 456 days.

(21) Appl. No.: 11/823,406

(22) Filed: Jun. 27, 2007

(65) Prior Publication Data

US 2009/0003338 A1     Jan. 1, 2009

(51) Int. Cl.
*H04L 12/28* (2006.01)
(52) U.S. Cl. .................. 370/398; 455/407; 455/567
(58) Field of Classification Search ........... None
See application file for complete search history.

(56) References Cited

U.S. PATENT DOCUMENTS

| | | | |
|---|---|---|---|
| 6,178,232 B1 * | 1/2001 | Latter et al. ............. | 379/88.21 |
| 2005/0117726 A1 * | 6/2005 | DeMent et al. ......... | 379/142.01 |
| 2005/0221793 A1 * | 10/2005 | Chin et al. ................ | 455/401 |
| 2006/0146746 A1 * | 7/2006 | Kim ........................... | 370/328 |
| 2006/0264208 A1 * | 11/2006 | Moon et al. ............... | 455/417 |
| 2007/0286372 A1 * | 12/2007 | DeMent et al. ......... | 379/142.01 |
| 2008/0063168 A1 * | 3/2008 | Haley et al. ............ | 379/201.01 |
| 2008/0259918 A1 * | 10/2008 | Walker et al. ............... | 370/389 |

* cited by examiner

*Primary Examiner*—Chirag G Shah
*Assistant Examiner*—Minh-Trang Nguyen
(74) *Attorney, Agent, or Firm*—Carmen Patti Law Group, LLC

(57) ABSTRACT

In a communications network that provides customized ring back tone (CRBT) service to voice over Internet protocol (VoIP) telephone calls, an announcement is played to a called party having CRBT service with VoIP telephony, after the called party answers a ringing signal but before a communications pathway is established between the calling party and the called party. The announcement notifies the called party of an incoming call during the time that a pathway is being set up and which would otherwise be silent.

23 Claims, 4 Drawing Sheets

SPECIAL TERMINATION MOBILE ANNOUNCEMENT, FOR WIRELESS VOIP CUSTOMIZED RING BACK TONE SERVICE

BACKGROUND

This invention pertains to voice over Internet protocol (VoIP) telephony. More particularly, this invention pertains to a particular artifact of VoIP telephony, which also provides customized ring back tone (CRBT) service, such as the CRBT service described in the inventor's issued U.S. Pat. No. 7,136,679.

FIG. 1 shows a simplified depiction of how voice over Internet protocol or VOIP occurs. A calling party 10 communicates with a called party 12 over a packet data network such as the Internet 14, by having pathways in each direction 16 by a proxy server 18. The pathways are "assigned" by assigning IP addresses to the data packets, the IP addresses designating a route through the network. The pathway is "assigned" during a set-up time, during which "signaling" messages 20 are exchanged between the proxy server 18 and the calling party 10 and between the proxy server 18 and the called party 12. After the proxy server receives "signaling" data 20 from the calling party 10, the proxy server 18 sets up, i.e., designates, a pathway through the network to the called party 12 by data "signaling" messages 22 that are also sent to the called party 12.

The inventor's issued U.S. Pat. No. 7,136,679 describes customized ring back tone (CRBT) service. FIG. 2 is a simplified depiction of how customized ring back tone service is provided in conjunction with VoIP telephone service. When a calling party 12 places a call to a called party 12, the calling party 10 hears a customized ring back tone instead of an ordinary ring back tone. The ring back tone (or perhaps a message) can be selected or generated by the called party 12. Music or messages, for example, can be sent from the customized ring back tone service server 24, over a pathway 26 through the network 1 to the calling party with the path between the server 24 and the calling party 10 set up through the network 1 by the proxy server 18.

A problem with VoIP that also provides customized to ring back tone service offered through an Internet protocol network is that a talk or "communications" pathway, i.e., a pathway from the called party 12 to the calling party 10 can take a considerable amount of time to set up. With VoIP that provides customized ring back tone service, when the called party 12 answers an incoming call ringing signal, the called phone will be silent to its user until a pathway is established through the network 1, leaving the phone's user wondering why the phone rang.

DETAILED DESCRIPTION

Figure 1:
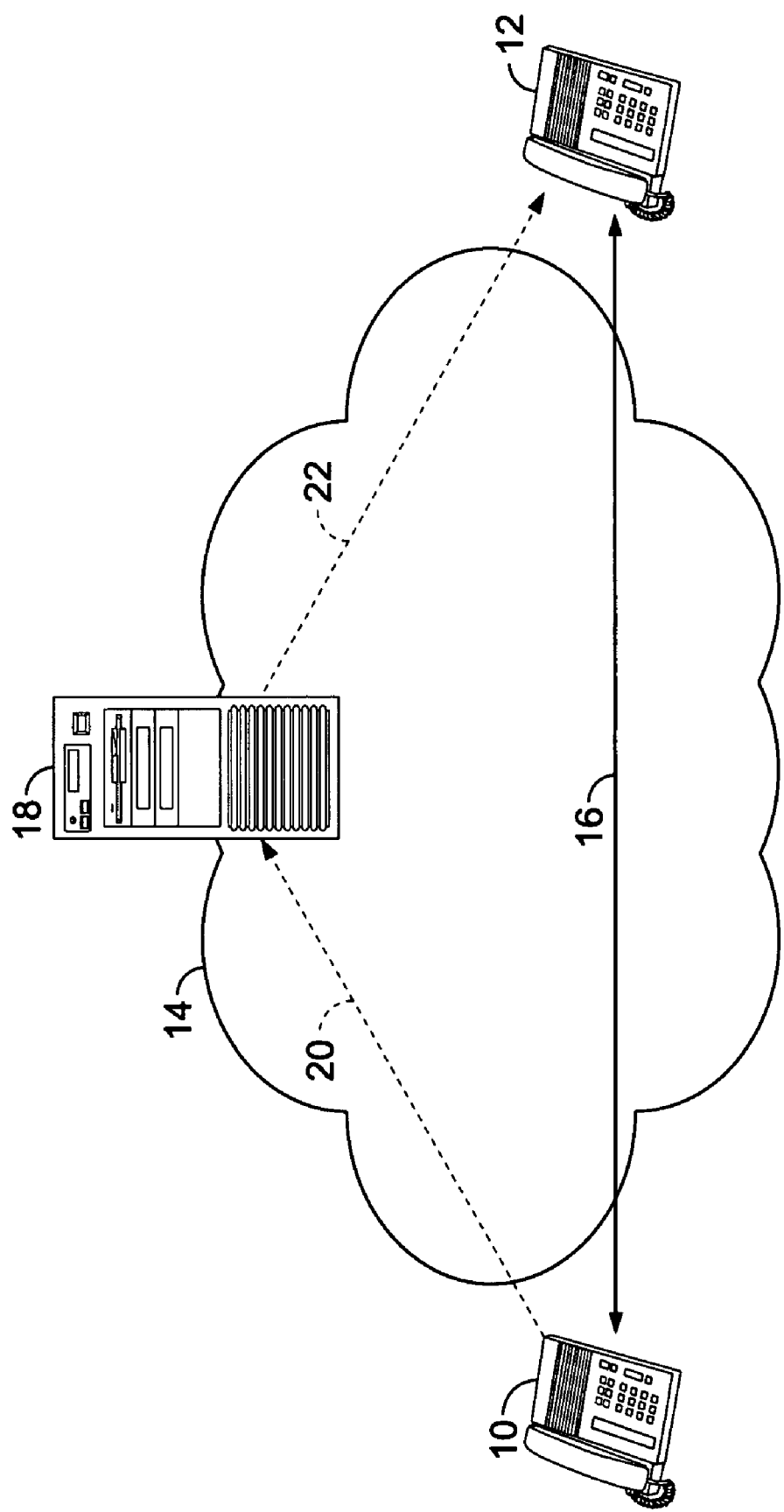
FIG. 1 shows a depiction of how voice over Internet protocol is set up through the Internet and depicts prior art.
Figure 2:
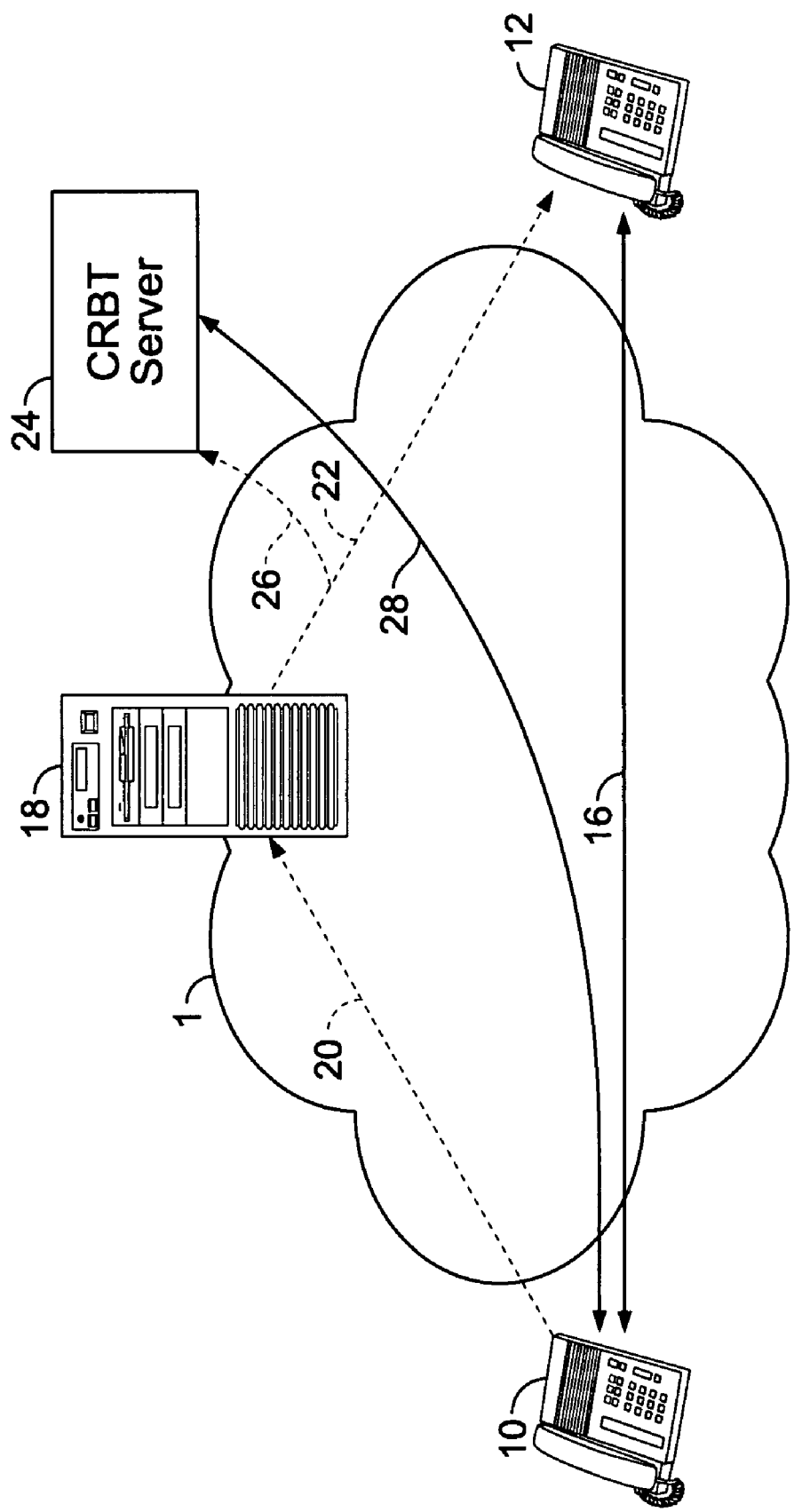
FIG. 2 shows a depiction of how voice over Internet protocol with customized ring back tone service is implemented through the Internet and also depicts prior art.
Figure 3:
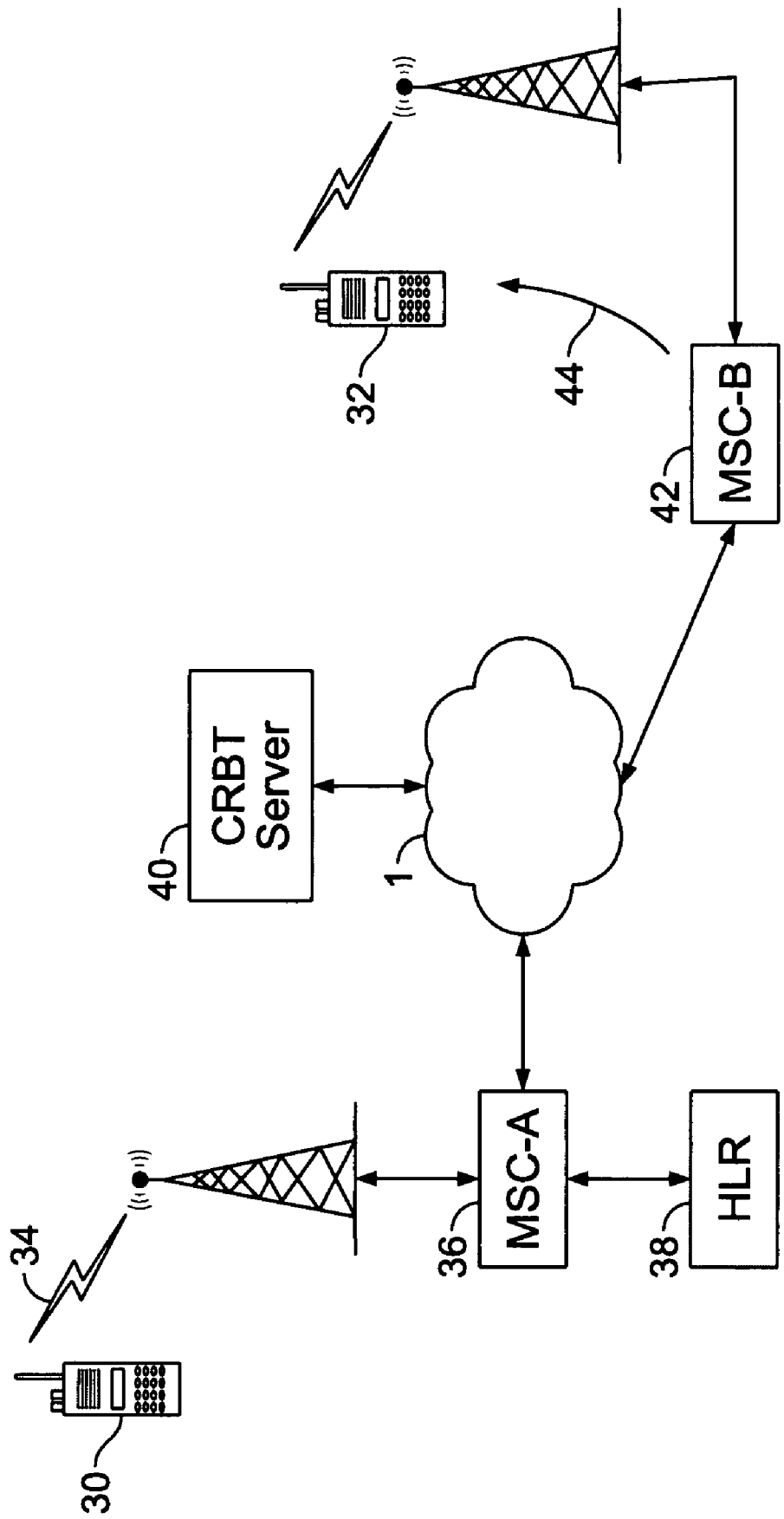
FIG. 3 is a depiction of a special termination announcement provided to a mobile device to which VoIP telephony and customized ring back tone service is provided.

Referring now to FIG. 3, the "calling party" of FIGS. 1 and 2 is depicted as a wireless communications device, such as a cellular telephone 30. For purposes of illustrating the claimed invention, the calling party is depicted as having an Internet protocol (IP) address, such as 135.0.0.0., which it uses to communicate through a wireless network that is not shown for simplicity. The called party 32 is also a wireless device that communicates through a wireless network and is the party that subscribes to, and which is provided with, VoIP and CRBT service. The called party 32 is also depicted as having an IP address for illustration purposes.

When the calling party 30 places a call to the called party 32 that uses voice over Internet protocol (VoIP) service and customized ring back tone service, the calling party 30 must of course "dial" the called party's 32 telephone number by sending a message 34 to the mobile switching center 36 (MSC 36) for the calling party 30. The message 34 is embodied as one or more data packets having the IP address of the calling party 30 as well as the IP address of the called party 32.

As is known in the art, when the mobile switching center 36 receives the IP packets from the calling party 30, it will of course recognize the calling party's IP address, e.g., 135.0.0.0 but it will also need to have the data packets that have the called party's telephone number in order to determine whether the called party 32 is provided with VoIP. The mobile switching center 36 first queries a home location register (HLR) 36 database to "locate" the called party 32. Data records stored in the home location register 36 identify or otherwise indicate that the called party 32 uses VoIP as well as customized ring back tone service. The HLR 36 will also determine the Internet protocol (IP) address to which data packets for a VoIP telephone call to the called party 32 are to be addressed so that a route between the two parties can be established through the network 1. When a party uses CRBT service, a connection is established between a CRBT server and the called party so that the calling party can be provided with the called party's custom ring back tone from the CRBT server. The HLR 36 thus provides data by which a pathway can be set up between the calling party and the CRBT server.

After the HLR 36 determines the IP address of the called party 32, e.g., 135.0.0.1, the HLR provides the called party's address data to the mobile switching center 36 of the calling party. The mobile switching center 36 then transmits an "invite" message having the calling party's IP address, to the customized ring back tone server 40. When the CRBT server 40 receives the invite data packet from the MSC 36, the CRBT server 40 sends data packets back to the calling party 30, i.e., back to the address that the CRBT server 40 received from the mobile switching center 36. The calling party 30 is thus able to hear a ring back tone, e.g., music or an announcement, from the server 40, which was customized or selected by the called party 32.

At virtually the same time that the mobile switching center 36 transmits the invite data packet to the customized ring back tone server 40, and after the CRBT server 40 has begun sending the customized ring back tone data packets to the calling party 30, the mobile switching center 36 also sends an invitation message 56 to the mobile switching center 42 for the called party 32. The invitation message is preferably a predetermined Internet protocol address, such as all zeroes, which the MSC 42 recognizes as a signal of the pendency of an incoming VoIP call.

When the mobile switching center 42 for the called party receives the invite message, the mobile switching center 42 will send a signal to the called party 32 that causes the called party phone to ring. The MSC 42 will at the same time, send back to the MSC 36, the IP address of the called party 32 so that a communications pathway can be set up between the calling party 30 and the called party 32. For purposes of the appurtenant claims, the signal that causes the called party 32 to ring can be considered a signal that announces an incoming call.

In the prior art, when the called party 32 answers the incoming call ringing signal from the MSC 42, but before a pathway to the calling party 30 is set up, the called party 32 hears dead silence, perhaps causing the called part to wonder why the phone rang. By using the method and apparatus set forth below and in the appurtenant claims, when the called party 32 answers the incoming call ringing signal from the MSC 42, but before a communication path is set up between the calling party 30 and the called party 32, the mobile switching center 42 for the called party 32, or some other server operatively coupled to the called party, provides an announcement to the called party 32 that informs the called party 32 of a pending incoming call and to wait for a pathway to be set up through the network 1. Such a notification message to the called party 32 can advantageously avoid having the called party 32 prematurely hanging up the phone and terminating the VoIP call-set up process, during the time that a VoIP call pathway through the network 1 is set up after the called party 32 answered. In at least one embodiment, the duration of the message provided to the called party 32 is at least as long as the time required to set up a communications pathway through the network 1.

Figure 4:
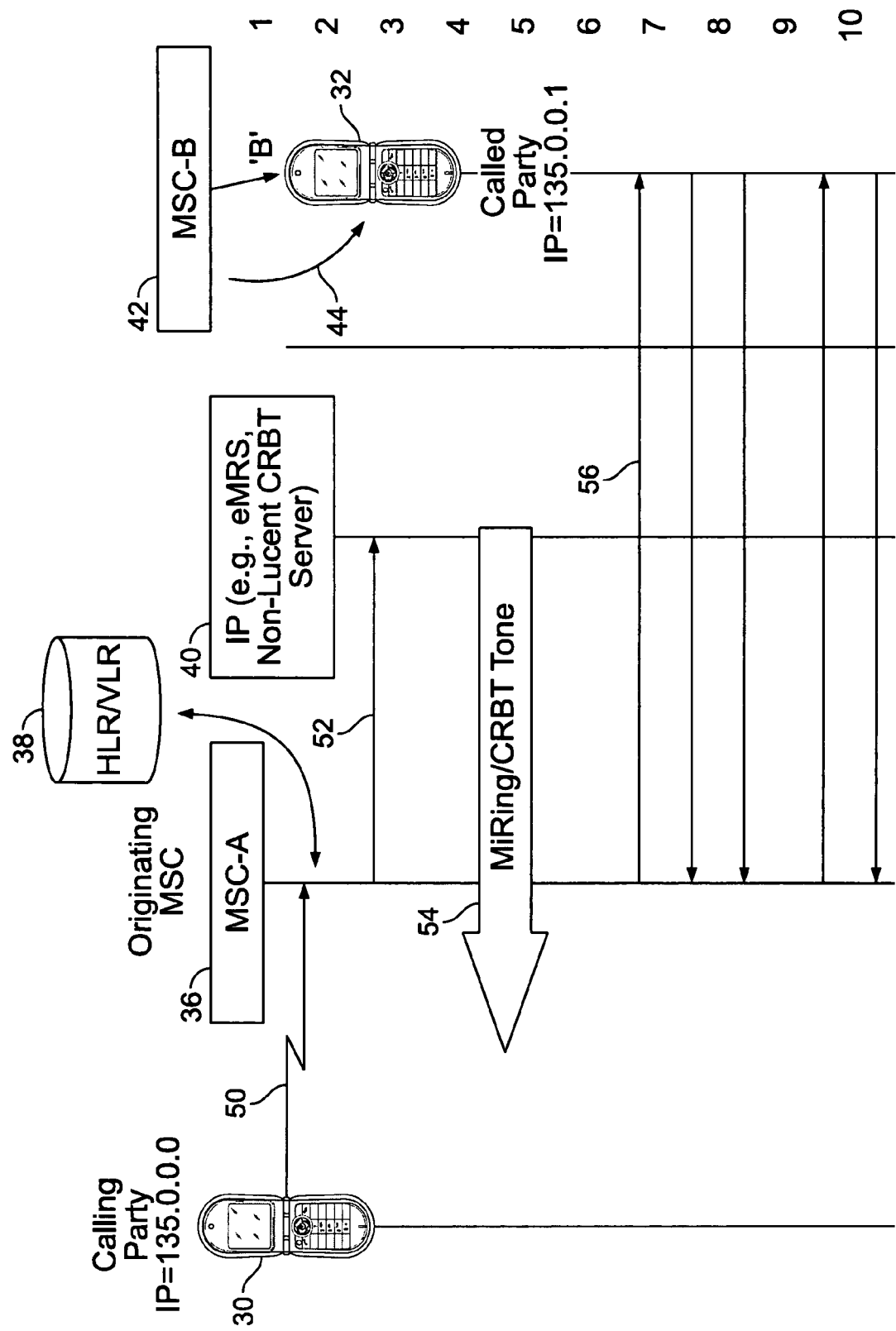
FIG. 4 is a message diagram depicting the methodology by which a special termination announcement is provided to a mobile device to which VoIP telephony and customized ring back tone service is provided.

FIG. 4 is a message sequence chart that depicts the message flow used in a preferred embodiment of the invention.

At step 50, the calling party having an IP address such as 135.0.0.0, sends a signal 34 to the MSC 36 for the calling party 30. The MSC 36 accesses information stored in the HLR to obtain the IP address of the called party 32 and determines that the called party 32 has customized ring tone (CRBT) service, which is provided from the CRBT server 40.

At step 52, the MSC 36 sends an invite message to the CRBT server 40. The invite message includes the IP address of the calling party 30, which the CRBT server 40 needs in order to properly address the data packets into which the customized ring back tone service is encoded.

At step 54, the CRBT server 40 sends out data packets representing the custom ring back tones, which are addressed to the calling party 30. When the MSC 36 receives the ring back tone packets from the CRBT server 40, the MSC 36 sends another message to the MSC 42 for the called party 32, announcing an incoming VoIP call to the called party 32. The MSC 42 instructs the called party 42 to ring. When the called party 32 answers, the MSC 42 then sends an announcement 44 to the called party 32, notifying the party 32 of the pendency of an incoming call. The announcement 44 played to the called party 32 can be any appropriate message, such as a request to not hang up, music or any other message recognizable as indicating the pendency of an incoming VoIP call.

When the pathways between the called party 32 and the calling party 30 are established through the IP network 1, the announcement 44 is terminated so that the call can proceed through the IP network as before.

In networks that provide VoIP telephony and customized ring back tone service, a called party's ability to hear an announcement of the pendency of an incoming call instead of the dead silence provided by prior art systems and methods, significantly reduces the likelihood that a called party will mistake an incoming VoIP call as a dropped call and hang up on a calling party before a connection is established between the parties.

The foregoing description is provided for illustration of the invention and not for purposes of limitation. The invention is not as described above but is instead defined by the appurtenant claims.

What is claimed is:

1. In a communications network that provides voice over Internet protocol (VoIP) telephony and customized ring back tone service to a first communications device (first device), a method of handling a VoIP call to the first communications device from a second communications device (second device), the method comprising the steps of:

sending a signal to the first device, which announces an incoming VoIP call to the first device; and when the incoming VoIP call from the second device to the first device is answered by the first device, but before a communications path is set up between the first device and the second device, sending a first message to the first device that informs a user of the first device of the pendency of an incoming call.

2. The method of claim 1, wherein the communications network is a wireless network.

3. The method of claim 2, wherein the first communications device is a wireless communications device and the first message is sent to the first device by a mobile switching center for the first device.

4. The method of claim 1, wherein the first message is an announcement to the user of the first device that a call is coming into the first device.

5. The method of claim 1, wherein the first message is a request to the user of the first device to wait for the incoming call without hanging up.

6. The method of claim 1, wherein the signal to the first device is a predetermined Internet protocol (IP) address.

7. The method of claim 2, wherein the predetermined IP address is all zeroes.

8. The method of claim 1, wherein the second device has an IP address and wherein the method further comprises the step of:

sending the second device's IP address to a mobile switching center for the first device.

9. The method of claim 1, wherein the second device has an IP address and wherein the method further comprises the step of:

sending the second device's IP address to the first device.

10. The method of claim 8, wherein the first message's duration extends to when the mobile switching center for the first device receives the IP address of the second device.

11. The method of claim 9, wherein the first message's duration extends to when the first device receives the IP address of the second device.

12. In a wireless communications network that provides voice over Internet protocol (VoIP) telephony and customized ring back tone (CRBT) service to a first communications device (first device), a method of handling a VoIP call to the first communications device from a second communications device (second device), the method comprising the steps of:

receiving an Internet protocol (IP) address of the second device at a first switching system;

after receipt of the second device's IP address at the first switching system, sending a customized ring back tone to the IP address of the second device from a second switching system;

sending a first predetermined IP address to a third switching system for the first device, which announces an incoming VoIP call to the first device; and when the incoming VoIP call from the second device to the first device is answered by the first device, but before a communications path is set up between the first device and the second device, sending a first message to the first device from the third switching system, which informs a user of the first device of the pendency of an incoming call.

13. The method of claim 12, wherein the first switching system is a mobile switching center (MSC) for the second device.

14. The method of claim 12, wherein the second switching system is a custom ring back tone (CRBT) server.

15. The method of claim 12, wherein the third switching system is a mobile switching center (MSC) for the first device.

16. The method of claim 12, wherein the first switching system and the third switching system are one and the same.

17. The method of claim 12, wherein the first message is an announcement to the user of the first device that a call is coming into the first device.

18. The method of claim 12, wherein the first message is a request to the user of the first device to wait for the incoming call without hanging up.

19. The method of claim 12, wherein the first predetermined IP address is all zeroes.

20. A communications network that provides voice over Internet protocol (VoIP) telephone calls comprised of:

a first switching system operatively coupled to the network, the first switching system being configured to:

receive a first signal from a switching system to which a call-originating communications device is coupled, the call-originating communications device having a first IP address, the first signal being comprised of a second IP address;

upon receipt of the second IP address, send a ring signal to a call terminating communications device having a third IP address, the ring signal causing the call terminating communications device to announce an incoming call to a user of the call terminating communications device; and when the call terminating communications device goes off hook from a VoIP call sent by the call-originating communications device, send an announcement to the call terminating communications device, but before a communications path is set up between the call terminating communications device and the call-originating communications device, to inform the user of the call terminating communications device that a call to the call terminating communications device is being set up.

21. The method of claim 1, wherein the first message is music.

22. The method of claim 1, wherein a ringing signal of the incoming call is a custom ring-back tone.

23. An apparatus, comprising:

means for sending a signal to the first device, which announces an incoming VoIP call to the first device; and means for sending a first message to the first device that informs a user of the first device of the pendency of an incoming call when the incoming VoIP call from the second device to the first device is answered by the first device, but before a communications path is set up between the first device and the second device.

* * * * *